United States Patent
Colonna et al.

(10) Patent No.: US 9,706,363 B2
(45) Date of Patent: Jul. 11, 2017

(54) METHOD AND SYSTEM FOR IDENTIFYING SIGNIFICANT LOCATIONS THROUGH DATA OBTAINABLE FROM A TELECOMMUNICATION NETWORK

(71) Applicant: TELECOM ITALIA S.p.A., Milan (IT)

(72) Inventors: Massimo Colonna, Turin (IT); Marco Galassi, Reggio Emilia (IT); Marco Mamei, Reggio Emilia (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 15/304,020

(22) PCT Filed: Apr. 18, 2014

(86) PCT No.: PCT/EP2014/058003
§ 371 (c)(1),
(2) Date: Oct. 13, 2016

(87) PCT Pub. No.: WO2015/158399
PCT Pub. Date: Oct. 22, 2015

(65) Prior Publication Data
US 2017/0041762 A1 Feb. 9, 2017

(51) Int. Cl.
H04W 24/00 (2009.01)
H04W 4/02 (2009.01)
H04L 29/08 (2006.01)

(52) U.S. Cl.
CPC ............ *H04W 4/028* (2013.01); *H04L 67/16* (2013.01)

(58) Field of Classification Search
CPC .................................................. H04W 4/028
(Continued)

(56) References Cited

U.S. PATENT DOCUMENTS 6,026,304 A * 2/2000 Hilsenrath ............. G01S 5/021
455/456.2
6,240,069 B1 * 5/2001 Alperovich ............. H04W 4/06
370/260

(Continued)

FOREIGN PATENT DOCUMENTS

WO   WO 2013/107669 A1   7/2013

OTHER PUBLICATIONS

International Search Report and Written Opinion issued Jul. 17, 2014, in PCT/EP2014/058003 filed Apr. 18, 2014.

(Continued)

*Primary Examiner* — Babar Sarwar
(74) *Attorney, Agent, or Firm* — Oblon, McClelland, Maier & Neustadt, L.L.P.

(57) ABSTRACT

A method for identifying and locating at least one relevant location visited by at least one individual within a geographical area served by a wireless telecommunication network. The method includes: identifying and clustering events that occurred within a predefined distance from each other and having a similar probability, computing a weight value for each cluster of events identified, comparing the weight value with a threshold weight value, if the weight value is equal to, or greater than, the threshold weight value, identifying the relevant location as belonging to a selected typology of relevant location, and providing an indication of the position of the at least one relevant location based on recorded position data of the events of the cluster, or if the weight value is lower than the threshold weight value, identifying the relevant location as not belonging to the selected typology of relevant location.

19 Claims, 7 Drawing Sheets

(58) Field of Classification Search
USPC ............ 455/404.2, 412.1–414.2, 418–422.1,
455/41.1–41.2, 456.1, 456.3, 457, 552.1;
370/328, 338, 312
See application file for complete search history.

(56) References Cited

U.S. PATENT DOCUMENTS

| | | | | |
|---|---|---|---|---|
| 6,975,873 | B1* | 12/2005 | Banks | H04W 64/00 455/456.1 |
| 7,536,695 | B2* | 5/2009 | Alam | H04L 67/18 455/456.1 |
| 8,135,505 | B2* | 3/2012 | Vengroff | G06Q 30/02 701/24 |
| 2002/0164995 | A1* | 11/2002 | Brown | G01S 5/02 455/456.1 |
| 2002/0183072 | A1* | 12/2002 | Steinbach | G06F 17/3087 455/456.1 |
| 2004/0266457 | A1* | 12/2004 | Dupray | G01S 5/0268 455/456.5 |
| 2006/0020387 | A1* | 1/2006 | Nagata | G01C 21/3685 701/516 |
| 2007/0149216 | A1* | 6/2007 | Misikangas | H04W 64/00 455/456.1 |
| 2007/0287473 | A1* | 12/2007 | Dupray | H04W 4/02 455/456.1 |
| 2008/0305806 | A1* | 12/2008 | Jung | H04L 29/12783 455/456.1 |
| 2009/0005987 | A1* | 1/2009 | Vengroff | G06Q 30/02 701/300 |
| 2009/0312946 | A1* | 12/2009 | Yoshioka | G01C 21/26 701/532 |
| 2010/0197318 | A1* | 8/2010 | Petersen | G06Q 10/10 455/456.1 |
| 2010/0198826 | A1* | 8/2010 | Petersen | G06Q 10/10 455/456.1 |
| 2011/0151898 | A1* | 6/2011 | Chandra | H04W 4/02 455/466 |
| 2012/0184286 | A1* | 7/2012 | Richardson | G01S 5/0236 455/456.1 |
| 2012/0310736 | A1* | 12/2012 | Vengroff | G06Q 30/02 705/14.53 |
| 2014/0018103 | A1* | 1/2014 | Wigren | G01S 5/0009 455/456.2 |
| 2014/0370844 | A1* | 12/2014 | Lara | H04W 4/028 455/405 |
| 2015/0005007 | A1* | 1/2015 | Schewel | H04W 4/02 455/456.3 |
| 2015/0300832 | A1* | 10/2015 | Moore | G01C 21/36 455/456.3 |
| 2016/0044467 | A1* | 2/2016 | Clausen | H04W 4/04 455/457 |
| 2016/0100288 | A1* | 4/2016 | Chaponniere | H04W 4/023 455/456.1 |

OTHER PUBLICATIONS

Calabrese, Francesco et al., "Human Mobility Prediction based on Individual and Collective Geographical Preferences", 13$^{th}$ International IEEE Annual Conference on Intelligent Transportation Systems, (Sep. 19-22, 2010), pp. 312-317, XP031792650.

Di Lorenzo, Giusy et al., "Identifying Human Spatio-Temporal Activity Patterns from Mobile-Phone Traces", 14$^{th}$ International IEEE Conference on Intelligent Transportation Systems, (Oct. 5-7, 2011), pp. 1069-1074, XP032023369.

\* cited by examiner

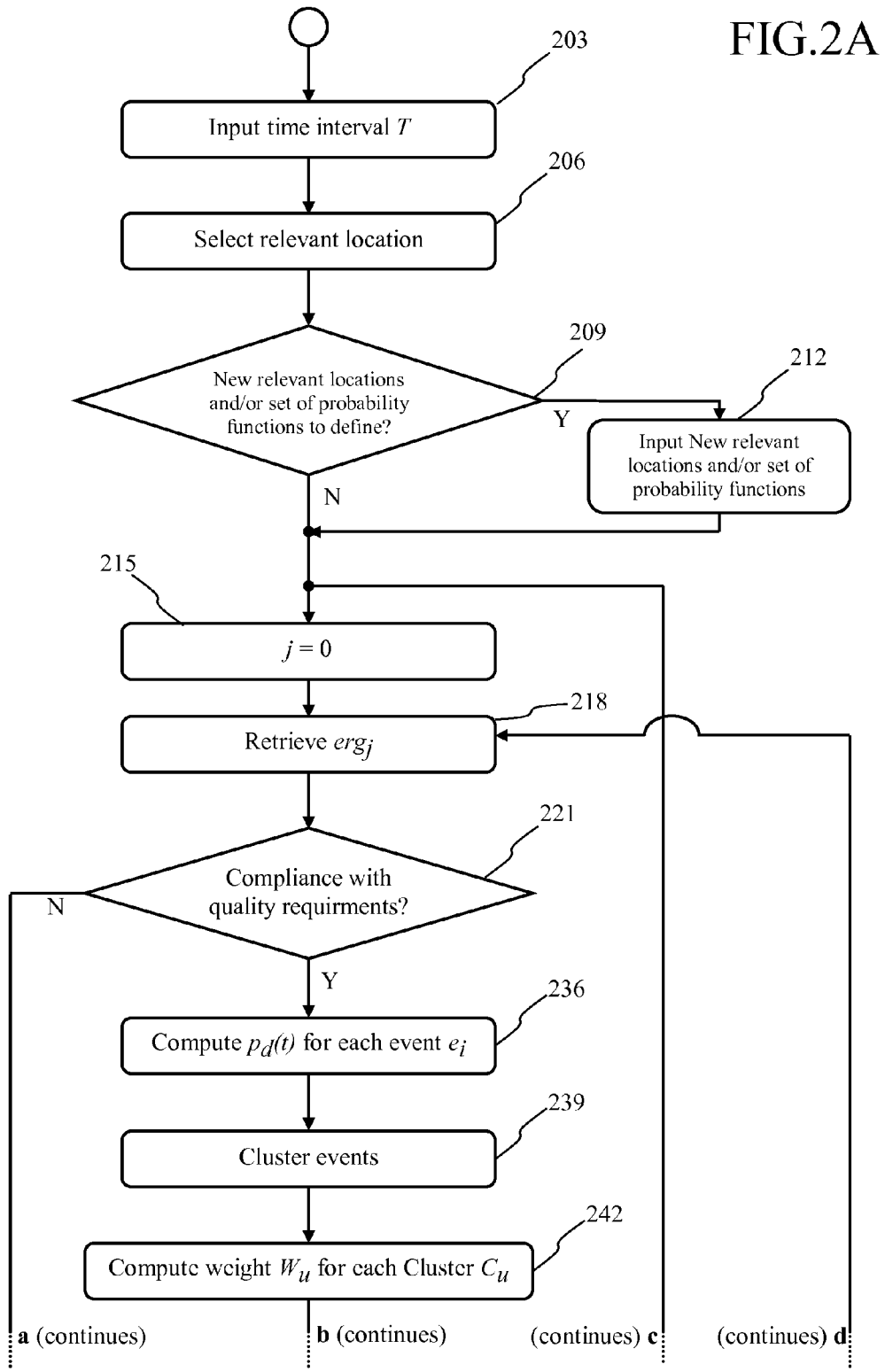

METHOD AND SYSTEM FOR IDENTIFYING SIGNIFICANT LOCATIONS THROUGH DATA OBTAINABLE FROM A TELECOMMUNICATION NETWORK

BACKGROUND OF THE INVENTION

Field of the Invention

The present invention refers to communication systems. More particularly, the present invention relates to the field of wireless or mobile telecommunication networks. Even more particularly, the present invention relates to a method and a system adapted to determine the typology and/or the position of a plurality of relevant locations visited by individuals within a surveyed geographic area (e.g., a city, a municipality, etc.) based on information retrieved from a wireless or mobile telecommunication network(s) serving such surveyed area.

Overview of the Related Art

The capability of identifying places visited by individuals—referred to as relevant locations in the following—, along with a frequency with which such relevant locations are visited and typical time intervals in which the relevant locations are visited results to be extremely useful for a variety of analysis of human habits. For example, such information might be used for traffic analysis, which is fundamental for mobility planning such as management of public transport and/or for forecasting trends in traffic of vehicles. Other examples in which the above-mentioned information may be successfully used are the field of telecommunication network management and/or epidemiology (e.g., for forecasting epidemic diffusions).

Nowadays, mobile phones have reached a thorough diffusion among the population of many countries, and mobile phone owners almost always carry their mobile phones with them. Since mobile phones communicates with a plurality of base stations of the mobile phone networks, and each base station covers (i.e., serves) one or more predetermined geographic areas (or cells) which are known to the mobile phone network operator, mobile phones result to be optimal candidates as tracking devices for collecting data useful for identifying relevant locations visited by an individual, for how long the individual remains in each relevant location and how frequently each relevant location is visited.

In the art many systems and methods have been proposed in order to collect information about time and locations at and in which a User Equipment (UE, e.g. a mobile phone, a smartphone, a tablet, etc.) of an individual connects to the mobile phone network (e.g., for performing a voice call or sending a text message), and use such collected information in order to derive information related to relevant locations visited by the individual.

For example, N. Caceres, J. Wideberg, and F. Benitez "Deriving origin destination data from a mobile phone network", Intelligent Transport Systems, JET, Vol. 1, No. 1, pages 15-26, 2007, describes a mobility analysis simulation of moving vehicles along a highway covered by a plurality of GSM network cells. In the simulation the entries of Origin-Destination matrices are determined by identifying the GSM cells used by the mobile phones in the moving vehicles for establishing voice calls or sending SMS.

M. C. González et al. "Understanding individual human mobility patterns", Nature pages 453, 779-782, 2008 defined a probability density function adapted to identify home and work places by studying trajectories of 100,000 individuals tracked over a time interval of six months.

In US 2009/0157496 a personal broadcasting system and method is described for automatically matching and introducing users based on their real-time locations, such that users identified as capable of or likely to form a relationship can be notified of that fact at a point in time when it is easy to meet. A system and method is also described that allows at least one of two users that have visited or passed through the same location at different points in time to automatically receive information about the other despite the temporal separation between them.

In F. Calabrese et al. "Estimating Origin-Destination Flows Using Mobile Phone Location Data", IEEE Pervasive, pages 36-44, October-December 2011 (Vol. 10 No. 4), a method is proposed that identifies a home location of an individual on the basis of a number of connections to a telecommunication network performed during night hours by a user equipment of the individual, and that identifies a work location of the individual according to a number of connections to a telecommunication network performed during business hours.

In R. A. Becker et al., "A Tale of One City: Using Cellular Network Data for Urban Planning," IEEE Pervasive Computing, Vol. 10, No. 4, pages 18-26, 2011, a method is proposed for identifying a city in which an individual works by analyzing phone calls performed by the individual during business hours over a plurality of weekdays.

US 2006/0293046 proposes a method for exploiting data from a wireless telephony network to support traffic analysis. Data related to wireless network users are extracted from the wireless network to determine the location of a mobile station. Additional location records for the mobile station can be used to characterize the movement of the mobile station: its speed, its route, its point of origin and destination, and its primary and secondary transportation analysis zones. Aggregating data associated with multiple mobile stations allows characterizing and predicting traffic parameters, including traffic speeds and volumes along routes.

In S. Isaacman et al., "Identifying Important Places in People's Lives from Cellular Network Data", in Pervasive Computing, Vol. 6696, pages 133-151, 2011 a method is proposed for recognizing locations visited by an individual through a clustering of base stations of a telecommunication network close to each other to which a User Equipment of the individual connects in order to perform communications. Moreover, the method identifies a home location and a work location of the individual by applying a logistic regression having coefficients determined through information provided by a control group of individuals.

SUMMARY OF THE INVENTION

The Applicant has perceived a general lack of a capability of identifying and locating locations that, despite being different from home and work locations, are as well relevant, such as for example identify relevant locations visited less than daily (e.g., locations visited two or three times per week such as a fitness center, or even with a lower frequency such as a clinic). Indeed, known methods and systems are substantially limited to the identification and the locating of home and work locations of individuals, which are visited daily and for time intervals that can be easily established—e.g., the majority of the individuals during a day stay at the location where they work (work location) in a time window ranging approximately from 7:00 a.m. to 7:00 p.m., while they stay at the location where they live (home location) in a complementary time window ranging approximately from 7:00 p.m. to the 7:00 a.m. of the next day.

The Applicant has observed that generally, method and systems known in the art are unable to accurately identify and locate relevant locations visited by an individual with a relatively low frequency, lower than the frequency of work location and home location (e.g., a frequency lower than a daily periodicity, such as for example weekly).

Therefore, subsequent analyses based on results obtained by the method and systems known in the art (e.g., traffic analysis) achieve a limited precision since the contributions related to such relevant locations visited with relatively low frequency are omitted from the analysis (e.g., with reference to the traffic analysis, movements of individual to or from relevant locations visited with a relatively low frequency are omitted from the analysis).

The Applicant has thus coped with the problem of devising a system and method adapted to identify and locate types of relevant locations visited by an individual even if visited with at a relatively low frequency, lower than the frequency of frequentation of work location and home location.

Particularly, one aspect of the present invention proposes a method for identifying and locating at least one relevant location visited by at least one individual within a geographical area served by a wireless telecommunication network. The method comprising the following steps: selecting a predetermined time period over which the identifying and locating of the at least one relevant location have to be performed, selecting a typology of relevant location to be identified and located, retrieving recorded time and position data recorded by the telecommunication network and regarding events in which a user equipment carried by the at least one individual interacted with the telecommunication network, computing a probability that each event for which recorded time and position data have been retrieved occurred in the relevant location of the selected type based on the recorded time data, identifying and clustering events occurred within a predefined distance from each other and having a similar probability, computing a weight value for each identified cluster of events, comparing the weight value with a threshold weight value, if the weight value is equal to, or greater than, the threshold weight value, identifying the relevant location as belonging to the selected typology of relevant location, and providing an indication of the position of the at least one relevant location based on the recorded position data of the events of the cluster, or if the weight value is lower than the threshold weight value, identifying the relevant location as not belonging to the selected typology of relevant location.

Preferred features of the present invention are set forth in the dependent claims.

In one embodiment of the present invention, the step of retrieving recorded time and position data comprises verifying minimum requirements for the time and position data for ensuring reliability and accuracy of the relevant location identification, wherein said verifying minimum requirements comprises one or more of the following steps: verifying if a total number of events within the predetermined time period, associated with the at least one individual is equal to, or greater than, a total events threshold, verifying if an average number of daily events, within the predetermined time period, associated with the at least one individual is equal to, or greater than, a predetermined average events threshold, and verifying if a number of events within a predetermined subinterval of the predetermined time period associated with the at least one individual is equal to, or greater than, a subinterval events threshold.

In one embodiment of the present invention, the step of computing a probability comprises exploiting a set of probability functions each of which describes a probability that the at least one individual is at the corresponding relevant location at a time instant defined in the time data during a predetermined subinterval of the predetermined time period.

In one embodiment of the present invention, said probability functions are based on statistical analysis data regarding an attendance rate of the selected typology of relevant location.

In one embodiment of the present invention, the step of identifying and clustering further comprises clustering events associated with the at least one individual in a same cluster only if they are sufficiently close in space and time to a centroid of said cluster.

In one embodiment of the present invention, the step of identifying and clustering further comprises exploiting the Hartigan Leader algorithm.

In one embodiment of the present invention, the step of identifying and clustering further comprises, for each event associated with the at least one individual, computing a spatiotemporal distance function expressed as:

$$\mathrm{std}(c_u, e_i) = sd(c_u, e_i) + k \times td(c_u, e_i),$$

wherein $sd(c_u, e_i)$ is a spatial component of the spatiotemporal distance function, $td(c_u, e_i)$ is a time component of the spatiotemporal distance function, and k is an adjusting parameter for taking into account the influence of the time component over the spatial component.

In one embodiment of the present invention, the step of identifying and clustering further comprises computing the spatial component of the spatiotemporal function as:

$$sd(c_u, e_i) = \max[0, \mathrm{geo}(c_u, e_i) - (\bar{r} + r_i)],$$

where $\mathrm{geo}(c_u, e_i)$ is the distance between the centroid of the Cluster and the position indicated in the position data regarding the corresponding event, $\bar{r}$ is an average cluster radius and $r_i$ is a radius comprised in the position data regarding the event.

In one embodiment of the present invention, the step of identifying and clustering further comprises computing the time component of the spatiotemporal function as:

$$td(c_u, e_i) = \begin{cases} \bar{p} - p_d(t_i) & \text{if } \bar{p} \times p_d(t_i) \geq 0 \\ 1 & \text{if } \bar{p} \times p_d(t_i) < 0 \end{cases},$$

wherein $\bar{p}$ is the mean value of the probabilities computed for the events comprised in the cluster Cu, and $t_i$ is the time instant defined in the time data of the event for which the time component is computed.

In one embodiment of the present invention, the step of identifying and clustering further comprises comparing a result of the spatiotemporal distance function for the event with a spatiotemporal threshold distance and if such result is equal to, or lower than, the spatiotemporal threshold distance, considering the event as belonging to the cluster, whereas if such result is greater than the spatiotemporal threshold distance, considering the event as not belonging to the cluster.

In one embodiment of the present invention, the step of computing a weight value comprises composing the weight value as a linear combination of a plurality of partial weight values, each partial weight value being designed to take into account statistical aspects that affect the identification and the positioning of the selected relevant location.

the partial weight values comprise a first partial weight value which takes into account the probability that each event of the cluster has occurred, and is expressed as:

$$w_1 = \sum_{l=1}^{L} p_d(t_l),$$

where $t_l$ is the time instant indicated in the time data at which the event occurs on within the predetermined subinterval, and L is the number of events clustered in the same cluster.

In one embodiment of the present invention, the partial weight values comprise a second partial weight value which takes into account the number of predetermined subintervals of the predetermined time period in which events of the cluster occurs.

In one embodiment of the present invention, the partial weight values comprise a third partial weight value which takes into account a distribution of the occurrence of the events in a portion of the predetermined time period comprising a plurality of predetermined subinterval, and is expressed as:

$$w_3 = T \times H(X),$$

where $H(X)$ is the Shannon entropy of the cluster in a predetermined subinterval of the predetermined time period, and T is the predetermined time period expressed as a number of predetermined subintervals.

In one embodiment of the present invention, the method further comprises the step of computing a threshold weight value computed as per the weight value but based on an ideal cluster of ideal events associated with an ideal individual which are all generated in the selected relevant location and have a probability greater than zero.

In one embodiment of the present invention, the method further comprises the step of computing a threshold weight value computed as a linear combination of a mean value of the weight values of all clusters identified and a variance thereof.

In one embodiment of the present invention, the step of computing a threshold weight value comprises selecting as a threshold weight value the weight value with the highest value among all the weight values computed.

Another aspect of the present invention proposes a system coupled to a wireless telecommunication network adapted to implement said method. The system comprises: a computation engine adapted to process data retrieved from a mobile telephony network, a repository adapted to store data regarding interactions between the user equipment and the mobile telephony network, computation results generated by the computation engine and, possibly, any processing data generated by and/or provided to the system, an administrator interface operable for modifying parameters and/or algorithms used by the computation engine and/or accessing data stored in the repository.

In one embodiment of the present invention, the system further comprises at least one user interface adapted to receive inputs from, and to provide output to a user of the system, the user comprising one or more human beings and/or one or more external computing systems subscriber of the services provided by the system.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIGS. 2A and 2B are a schematic flow diagram of a method for identifying a selected type of relevant location according to an embodiment of the present invention;

DETAILED DESCRIPTION OF THE INVENTION

Figure 1:
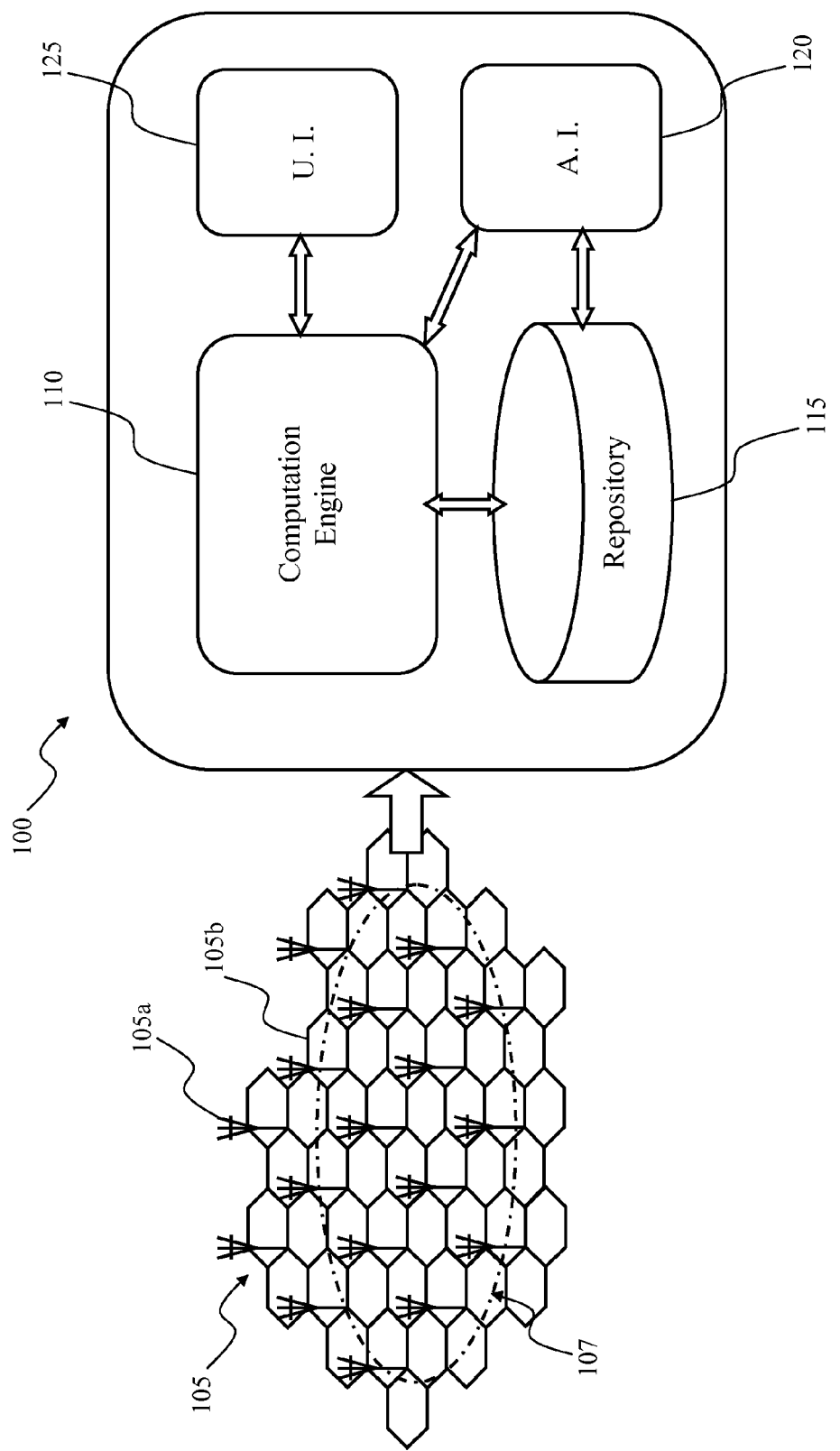
FIG. 1 is a schematic representation of a locations identification system according to an embodiment of the present invention.

With reference to the drawings, FIG. 1 is a schematic representation of a locations identification system, simply denoted as system 100 hereinafter, according to an exemplary embodiment of the present invention.

The system 100 is coupled to a communication network 105, such as a (2G, 3G, 4G or higher) mobile telephony network, and is configured for receiving from the mobile telephony network 105 positioning data of each User Equipment (UE in the following, e.g. a mobile phone, a smartphone, a tablet with 2G-3G-4G connectivity, etc.) of individuals located in a surveyed geographic area, schematized in FIG. 1 as the area within the dash-and-dot line 107 (e.g., a city, a municipality, a district, etc.).

The mobile telephony network 105 comprises a plurality of base stations 105a geographically distributed in the surveyed area 107. Each base station 105a is adapted to manage communications of UE (not shown, such as for example mobile phones) in one or more served areas or cells 105b (in the example at issue, three cells are served by each base station 105a). Even more generally, each base station 105a of the mobile telephony network 105 is adapted to interact with any UE located within one of the cells 105b served by such base station 105a (e.g., interactions at power on/off, on location area update, on incoming/outgoing calls, on sending/receiving SMS and/or MMS, on Internet access etc.). Such interactions between UE and mobile telephony network 105 will be generally denoted as events $e_i$ (i= 1, . . . , M; M≥0) in the following.

It should be apparent that the surveyed geographic area 107 may be regarded as subdivided in a plurality of sectors, each corresponding to a respective cell 105b of the (part of the) mobile telephony network 105 superimposed on the surveyed area 107.

The system 100 comprises a computation engine 110 adapted to process data retrieved from the mobile telephony network 105, and a repository 115 (such as a database, a file system, etc.) adapted to store data regarding interactions between the UE and the mobile telephony records 105, computation results generated by the computation engine 110 and, possibly, any processing data generated by and/or provided to the system 100 (generally in a binary format). The system 100 is provided with an administrator interface 120 (e.g., a computer) operable for modifying parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) adapted to receive inputs from, and to provide output to a user of the system 100. The term "user" as used in the present disclosure may refer to one or more human beings and/or to an external computing systems (such as a computer network, not shown) of a third party being subscriber of the services provided by the system 100 and enabled to access the system 100—e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115 connected to other machines implementing administrator and user interfaces 120 and 125) or of virtual type (e.g., by implementing one or more virtual machines in a computers network).

The system 100 is adapted to retrieve (and/or receive) an event record $er_i$ for each event $e_i$ occurred between a UE and the mobile telephony network 105 (through one of its base stations 105a) within the surveyed geographic area 107. Preferably, each event record $er_i$ retrieved from the mobile telephony network 105 comprises—in a non-limitative manner—an identifier of the UE that is involved in the corresponding event $e_i$ (e.g., the UE identifier may be selected between one or more among the International Mobile Equipment Identity—IMEI, the International Mobile Subscriber Identity—IMSI and the Mobile Subscriber ISDN Number—MSISDN code), time data (also denoted as timestamps) indicating the time at which the corresponding event $e_i$ has occurred, and UE geographical position data, e.g. spatial indications based on the cell 105b in which the UE is located at the time of occurrence of the corresponding event $e_i$.

In one embodiment of the present invention, the UE identifier of the UE involved in the event record $er_i$ may be provided as encrypted information in order to ensure the privacy of the UE owner. Anyway, if the need arises, the encrypted information (i.e., the identity of an individual corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2012.

The system 100 may retrieve (and/or receive) the event records $er_i$ related to a generic UE from the mobile telephony network 105 by acquiring records of data generated and used in the mobile telephony network 105. For example, in case the mobile telephony network 105 is a GSM network, Charging Data Records (CDR), also known as call data record, and/or Visitor Location Records (VLR) may be retrieved from the mobile telephony network 105 and re-used as data records $er_i$. The CDR is a data record (usually used for billing purposes by a mobile telephony service provider operating through the mobile telephony network 105) that contains attributes specific to a single instance of a phone call or other communication transaction performed between a UE and the mobile telephony network 105. The VLR are databases listing UE that have roamed into the jurisdiction of a Mobile Switching Center (MSC, not shown) of the mobile telephony network 105, which is a management element of the mobile telephony network 105 managing events over a plurality of base stations 105a. Each base station 105a in the mobile telephony network 105 is usually associated with a respective VLR.

Conversely, if the mobile telephony network 105 is a LTE network, records of data associated with the event records $er_i$ of a generic UE are generated by a Mobility Management Entity, or MME, comprised in the mobile telephony network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_i$ comprising a univocal identifier of individuals (such as the UE identifier mentioned above), a position indication of such individuals, and a time indication of an instant during which such event has occurred.

In operation, event records $er_i$ may be continuously retrieved by the system 100 from the mobile telephony network 105. Alternatively, event records $er_i$ may be collected by the system 100 periodically, e.g. for a predetermined time period (e.g., on a daily or weekly basis). For example, event records $er_i$ may be transferred from the mobile telephony network 105 to the system 100 as they are generated, in a sort of "push" modality, or event records $er_i$ may be collected daily in the mobile telephony network 105 and then packed and transferred to the system 100 periodically or upon request by the system 100.

The event records $er_i$ retrieved from the mobile telephony network 105 are stored in the repository 115, where they are made available to the computation engine 110 for processing. Preferably, event records $er_i$ generated by a same UE are grouped together in the repository 115, e.g. event records $er_i$ are grouped together if they comprise a common identifier of the UE (i.e., the event records $er_i$ comprise the identifier of the same UE and/or individual owner of the UE) and are denoted to as event records group $erg_j$ (e.g., $j=0, \ldots, N$, $N \geq 0$) hereinafter.

The computation engine 110 processes the event records $er_i$ (as discussed in detail below) according to instructions provided by the system administrator (through the administrator interface 120), for example stored in the repository 115, and according to instructions provided by a user (through the user interface 125). Finally, the computation engine 110 provides the results of the processing performed on the event records $er_i$ to the user through the user interface 125, and optionally stores such processing results in the repository 115.

In the solution according to an embodiment of the present invention, the system 100 is adapted to identify a position and a typology of a location, relevant location hereinafter, visited by individuals based on events $e_i$ generated by an interaction between the UE of the individuals and the mobile telephony network 105 serving such UE.

In a preferred embodiment of the present invention, the system 100 is adapted to identify and locate one or more relevant locations belonging to one or more corresponding typologies of locations selected by the user of the system 100 (through the user interface 125). In other words, the user of the system 100 may select one or more types of relevant locations (such as, homes, workplaces, gyms, pubs, clubs, etc.), then the system 100 identifies and locates relevant locations of the selected one or more types within the surveyed area 107 based on the event records $er_i$ collected.

Figure 2B:
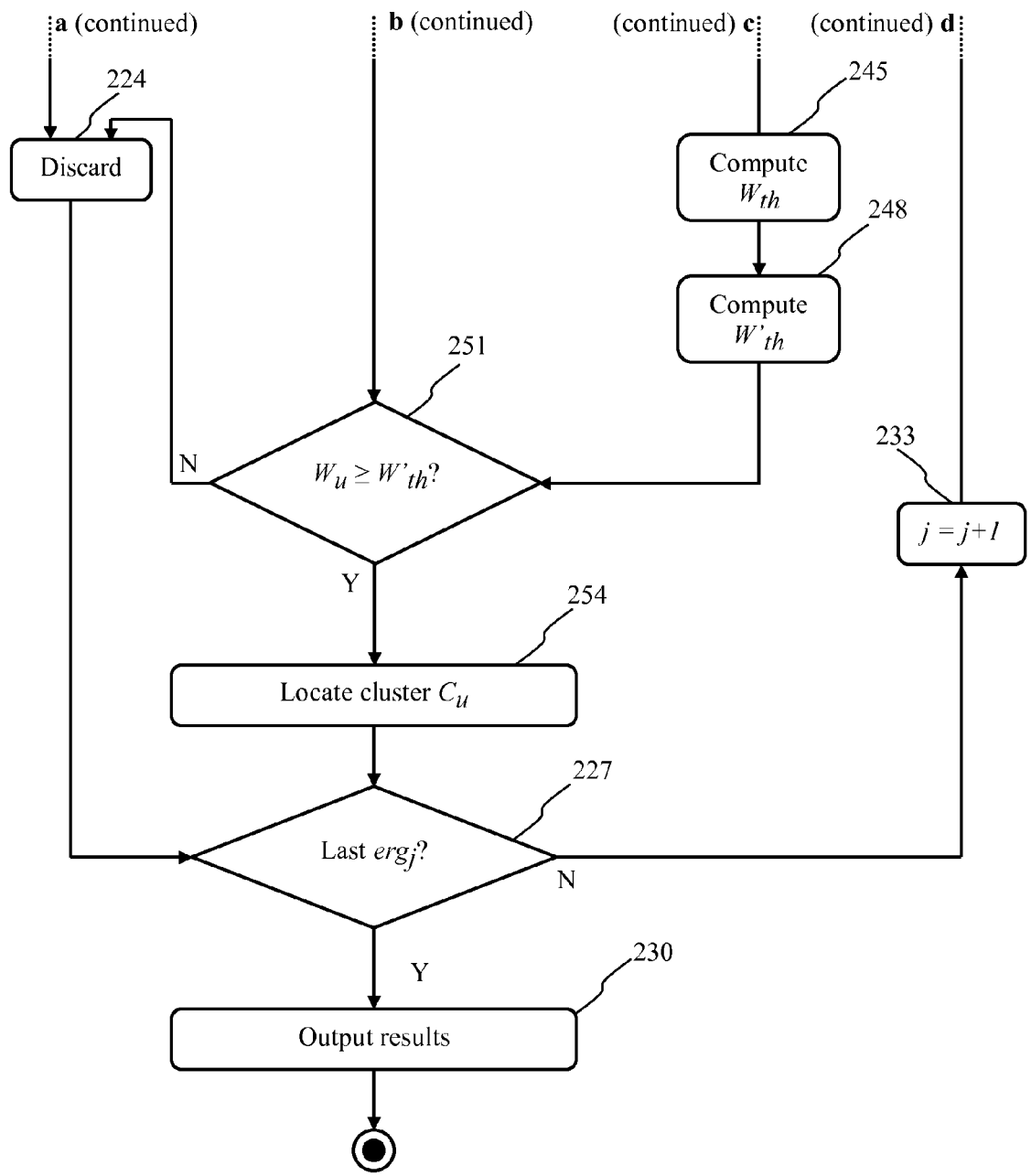
Figure 3A:
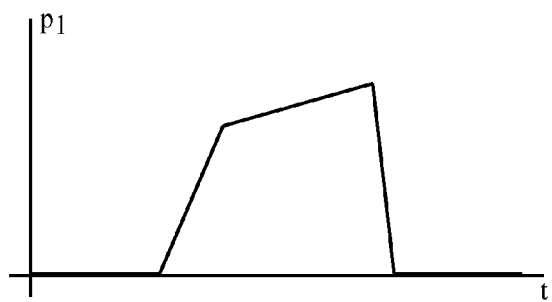
FIGS. 3A-3G are examples of a weekly set of probability functions representing the probability over time that an individual is at a work location.
Figure 3B:
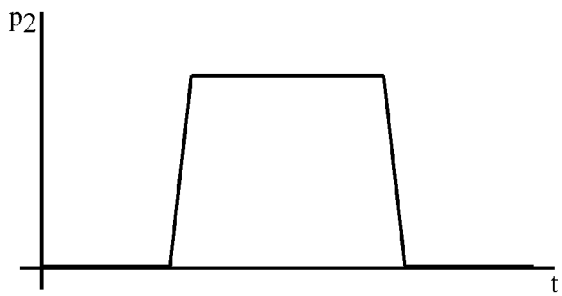
Figure 3C:
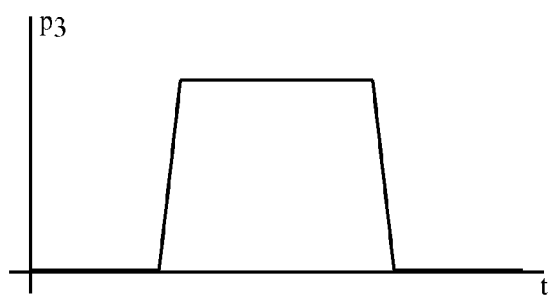
Figure 3D:
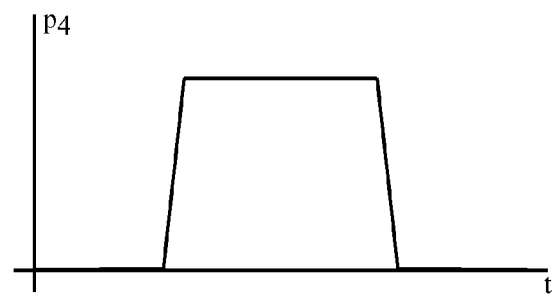
Figure 3E:
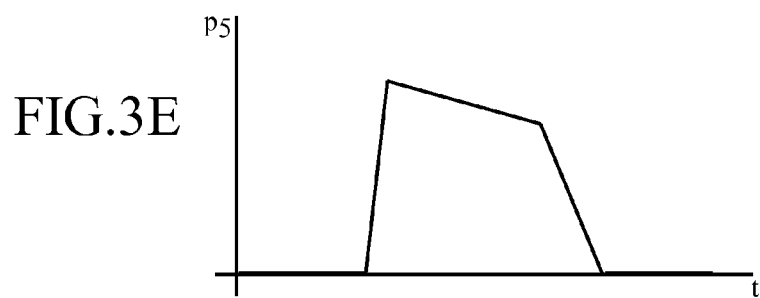
Figure 3F:
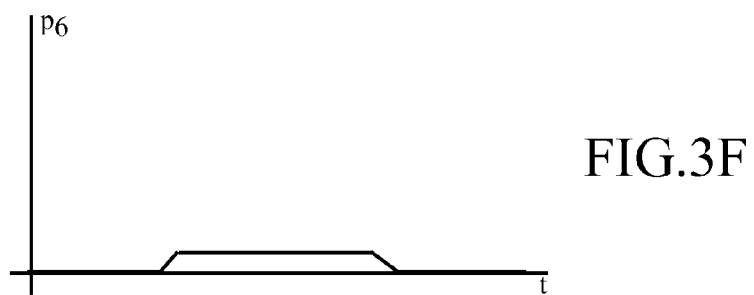
Figure 3G:
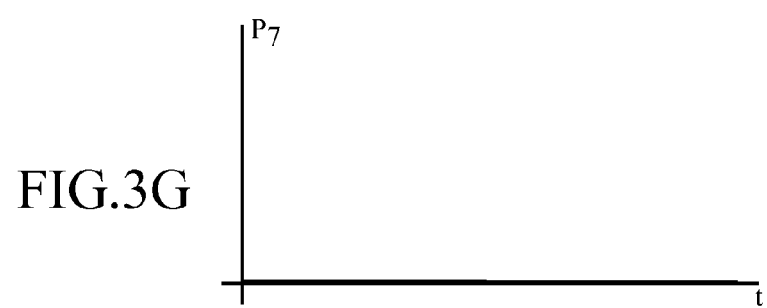
Figure 4A:
FIGS. 4A-4G are examples of a weekly set of probability functions representing the probability over time that an individual is at an entertainment location.
Figure 4B:
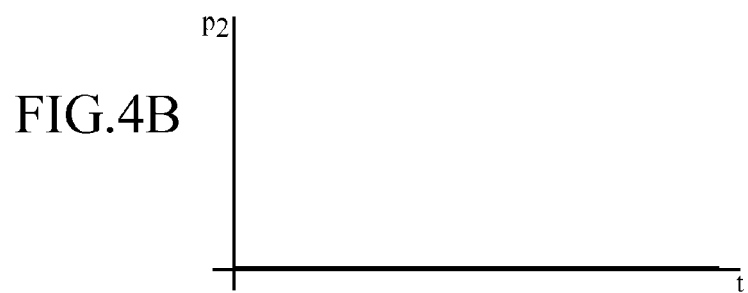
Figure 4C:
Figure 4D:
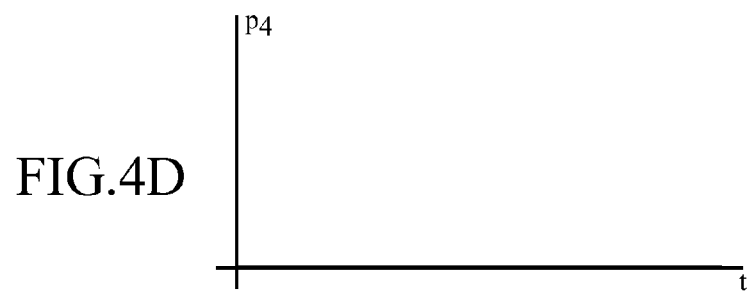
Figure 4E:
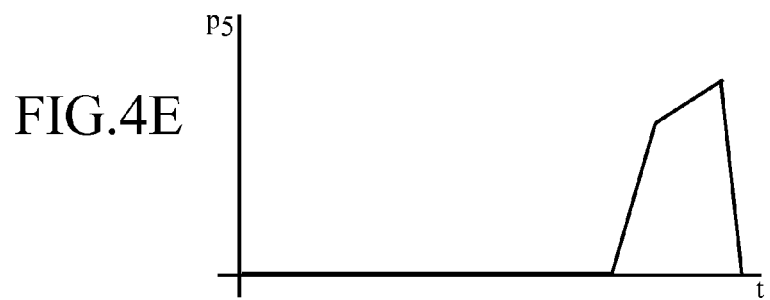
Figure 4F:
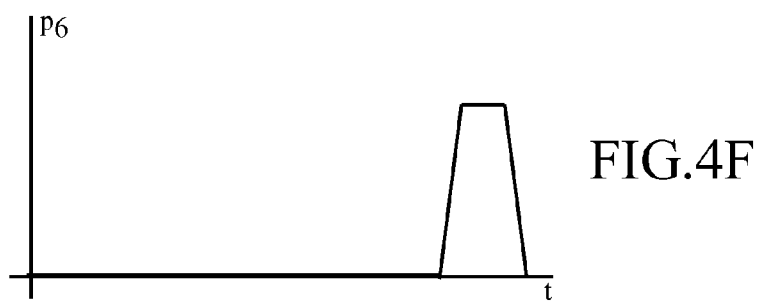
Figure 4G:
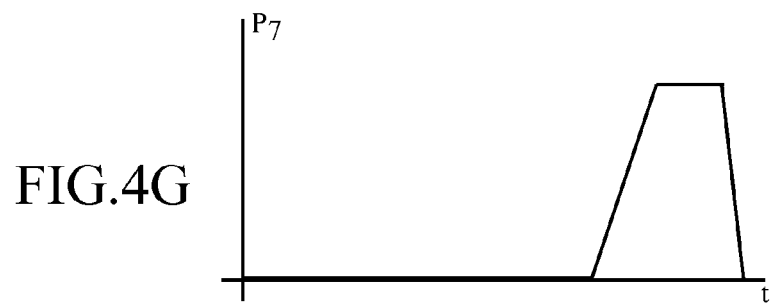

An operation of the system 100 is now described, with reference to FIGS. 2A and 2B that are a schematic flow diagram illustrating, in a non-limitative manner, steps of an operation of the system 100.

Initially, the user of the system 100 is asked to select through the user interface 125 an observation (time) period T (e.g., one or more days) within which the events $e_i$ to be considered for the processing occurred or, alternatively, to select all the events $e_i$ for which event records $er_i$ have been collected (step 203). For example, the observation period T may be selected from a time range extending from the time at which the oldest event record $er_1$ has been collected up to the time at which the newest event record $er_M$ has been collected.

The user of the system 100 is then asked to select through the user interface 125 one or more types of relevant locations to be identified (step 206)—for the sake of simplicity, in the following only a single type of relevant location to be identified will be considered. For example, the system 100 may provide a list of identifiable relevant locations to the user and, through the user interface 125, the user then can select one or more thereof.

In an embodiment of the present invention, each identifiable relevant location is associated with a corresponding set of probability functions $p_d(t)$ (d=D; where D is a positive integer). Each probability function $p_d(t)$ of the set describes the probability that an individual (together with her/his UE) is at the corresponding relevant location at a time instant t during an observation subinterval d. Observation subintervals d are portions of the observation period T. In a preferred embodiment of the invention, each observation subinterval d may be a portion of the observation period T with peculiar characteristics (with respect to the events $e_i$ as detailed in the following) that repeats periodically. For example, the observation period T may correspond to a month and each observation subinterval d may substantially correspond to a respective day of the week, i.e. from Monday (d=1) to Sunday (d=7), which are deemed to share common peculiar characteristics. Advantageously, the sets of probability functions $p_d(t)$ are stored in the repository 115 of the system 100.

In a preferred embodiment of the invention, each set of probability functions $p_d(t)$ comprises seven probability functions (d=1, ..., 7), each one describing the probability that the individual is at the corresponding relevant location during a respective day of the week. Under this assumption, $p_1(t)$ is the probability function during Mondays, $p_2(t)$ is the probability function during Tuesdays, and so on up to $p_7(t)$ that is the probability function during Sundays. Therefore, each probability function $p_d(t)$ of the set of probability functions $p_d(t)$ has a weekly periodicity (i.e., the same probability function $p_d(t)$ is used after seven days) based on the assumption that habits of individuals follow a substantially weekly routine—even though different sets of probability function $p_d(t)$ with a different periodicity or non-periodic may be devised, e.g. for taking into account holidays and/or vacation periods.

In one embodiment according to the present invention, the circumstance that, at predetermined time instants t, there is no possibility for the individuals to be at a certain identifiable relevant location (e.g., when the relevant location is not accessible by individuals; such as for example in the case of a closing time of a gym or other entertainment locations), may be expressed by means of a negative value of the probability function $p_d(t)$ calculated at that time instants, such as for example a value ranging from −0.1 to −0.3.

Examples of such set of probability functions $p_d(t)$ are shown in FIGS. 3A-3G, which show a probability function set referred to a working location, and in FIGS. 4A-4G, which show a probability function set referred to an entertainment location (e.g., a pub).

Focusing on FIGS. 3A-3G, the set of probability functions $p_d(t)$ shows the probability that an individual with a clerk-type work is at a respective working location. In detail, the probability functions $p_2(t)$, $p_3(t)$ and $p_4(t)$ for Tuesdays, Wednesdays and Thursdays, respectively, show a substantially constant and high probability (e.g., values equal to or grater than 0.7, for example values in the range from 0.7 to 0.9) that the individual is at the work location during central hours of the day (e.g., a 8-9 hours period). The probability functions $p_1(t)$ for Mondays and $p_5(t)$ for Fridays show rising and falling probability during time, respectively that takes into account working hours reduction associated with such days. The probability function $p_6(t)$ for Saturdays shows a low probability (e.g., values equal to or lower than 0.3, for example values in the range from 0.0 to 0.3) that the individual is at the work location, while the probability function $p_6(t)$ for Sundays shows a substantially zero probability that the individual is at the work location.

Conversely, focusing on FIGS. 4A-4G, the set of probability functions $p_d(t)$ shows the probability that an individual spends time at an entertainment location, such as a pub. In detail, the probability functions $p_1(t)$, $p_2(t)$, $p_3(t)$ and $p_4(t)$ for Mondays, Tuesdays, Wednesdays and Thursdays, respectively, show a substantially constant and very low probability (e.g., values equal to or lower than 0.2, for example values in the range from 0.0 to 0.2, or, possibly, negative values as described above, e.g. values in the range from −0.1 to −0.3) that the individual is at the entertainment location during such days. Conversely, the probability functions $p_5(t)$, $p_6(t)$, and $p_7(t)$ for Fridays, Saturdays and Sundays show a high probability (e.g., values equal to or grater than 0.6, for example values in the range from 0.6 to 0.7) that the individual spends time at the entertainment location during evening and night hours.

The sets of probability functions $p_d(t)$ may be determined by the system administrator based upon his/her knowledge of the surveyed area 107 and/or statistical surveys performed on the population of the surveyed area 107 and, possibly, of neighboring areas. For example, the probability functions $p_d(t)$ of the sets of probability functions $p_d(t)$ may be determined based on information acquired by performing a "reconnaissance" statistical analysis on a behavior of a sample of people (e.g., where the size of the sample may be determined based on the size of the surveyed area), i.e. the places (i.e., relevant locations) visited during days of a predetermined reconnaissance period (e.g., a predetermined number of days), and during which time instant(s) of the day such places are visited. Alternatively or in addition, the probability functions $p_d(t)$ of the sets of probability functions $p_d(t)$ may be determined based on attendance or "turnout" information—i.e., a precise or average number and its change over time of people present in a relevant location during such predetermined reconnaissance period—provided by management of the relevant locations to which the sets of probability functions $p_d(t)$ is referred. This way to define the sets of probability functions $p_d(t)$ results to be particularly advantageous (i.e., accurate) with respect to relevant location corresponding to entertainment location (e.g., cinemas, gyms, pubs, etc.).

In addition, the user of the system 100 may be allowed to provide customs sets of probability functions $p_d(t)$ through the user interface 125.

Turning back to FIGS. 2A and 2B, in addition, the system 100 may allow the user to modify existing sets of probability functions $p_d(t)$ and/or to define new relevant location types (i.e., not included in the list of identifiable relevant locations) to be identified and located by the system 100. For example, at step 206 the user may select to modify and/or insert sets of probability functions $p_d(t)$ along with selection of the one or more types of relevant locations to be identified (step 206). The system 100 therefore checks if one or more sets of probability functions $p_d(t)$ are to be modified and/or inserted (step 209). In the affirmative case, the system 100 asks the user to input (through the user interface 125) corresponding new sets of probability functions $p_d(t)$ to be used for identifying and locating new relevant locations (step 212).

Afterwards or in the negative case (i.e., no sets of probability functions $p_d(t)$ are to be modified and/or inserted), the computation engine 110 retrieves event records $er_i$ stored in the repository 115. Preferably, the computation engine 110 retrieves one group $erg_j$ of event records $er_i$ generated by a same UE at a time. For example, the computation engine 110 initializes a UE variable j (e.g., j=0, . . . , N, N≥0; step 215) and then retrieve, e.g. sequentially, from the repository 115 a corresponding j-th event records group $erg_j$ therein stored (step 218).

The system 100 may check if the retrieved event records group $erg_j$ satisfies quality requirements before processing them (step 221). The quality requirements are designed for ensuring reliability and accuracy in results provided by the system 100 obtained through computation involving probability and statistic computation. As a non-limitative example, data quality requirements to be fulfilled may comprise one or more of the following:

- a total number of events $e_i$, within the observation period T, associated with the event records group $erg_j$ is equal to, or greater than, a total events threshold;
- an average number of daily events $e_i$, within the observation period T, associated with the event records group $erg_j$ is equal to, or greater than, a predetermined average events threshold, and/or
- a number of daily (or a different observation subinterval d) events $e_i$ associated with the event records group $erg_j$ is equal to, or greater than, a daily (or a different observation subinterval d) events threshold.

Preferably, the quality requirements are set by the system administrator through the administrator interface 120—even though alternative embodiments of the invention in which the quality requirements may be at least partly set by the user of the system 100 through the user interface 125 are not excluded.

In the negative case, the event records group $erg_j$ do not satisfy quality requirements, thus the event records group $erg_j$ is discarded (step 224) and it is checked if the event records group erg was the last event records group to be considered (step 227). In the affirmative case, the processing ends with the provision of computation results to the user through the user interface 125 (step 230, described in detail below).

In the negative case, a next event records group $erg_{j+1}$ (associated with another UE) has to be processed, therefore the UE variable j is incremented by one (j=j+1; step 233) and the operation returns to the step 218 in which the (next) j+1-th event records group $erg_{j+1}$ stored in the repository 115 is retrieved.

If the quality requirements check (back at step 221) has a positive outcome, for each event $e_i$ associated with an event record $er_i$ of the event records group erg the system 100 computes a probability value that such event $e_i$ occurred at the selected relevant location (step 236). For this purpose, the time data in each event record $er_i$ is used for selecting the probability function $p_d(t)$ of the set of probability functions $p_d(t)$ to be used (e.g., according to the day of the week indicated in the time data) and a time instant $t_i$ to be used (e.g., according to the moment of the day indicated in the time data) in the computation of the probability value.

Subsequently, the event records $er_i$ of the event records group erg are used for clustering together similar events $e_i$ associated thereto (step 239) as described here below.

In the present disclosure, with the term "clustering" is intended the task of assigning a set of objects (the events $e_i$) into groups, called clusters $C_u$ (e.g., u=0, . . . , U; U≥0), in such a way that the objects (the events $e_i$) in a same cluster are more "similar" to each other than those of other clusters.

The similarity among events $e_i$ is defined through a distance function calculating a distance (in space and time, as described below) between an object to be clustered and a central point, or centroid, $c_u$ of the cluster $C_u$ defined by other objects already clustered together in such cluster $C_u$. For example, in an embodiment of the present invention, the centroid $c_u$ of a cluster $C_u$ may be defined as a point having an average event probability $\bar{p}$ and an average cluster radius $\bar{r}$, where the average event probability $\bar{p}$ defined as the mean value of the probability functions $p_d(t)$ of the events $e_i$ comprised in the cluster Cu while the average location radius $\bar{r}$ defined as the average of the radius $r_i$ of the cells 105b of the mobile telephony network 105 in which the events $e_i$ occurred (the radius $r_i$ is thus also the radius of the associated event $e_i$).

For example, the events $e_i$ are considered one by one, thus initially the generic cluster Cu comprises only the first event considered $e_1$ which is also made correspond to the centroid $c_u$. Every time a subsequent event $e_i$ is comprised in the same cluster Cu, the centroid $c_u$ (i.e., the average event probability $\bar{p}$ and the average location radius $\bar{r}$) is recalculated taking into account such subsequently comprised event $e_i$.

Therefore, in the embodiment of the present invention the events $e_i$ associated with the same event records group $erg_j$ are analyzed and clustered together if they are sufficiently close in space and time to the centroid $c_u$ of the cluster $C_u$. The clustering of the event may be performed through any suitable clustering algorithm known in the art, such as for example the Hartigan Leader algorithm described in J. A. Hartigan "Clustering Algorithms", John Wiley e Sons Inc (April 1975).

In a preferred embodiment of the invention, such a "closeness" between the generic event $e_i$ and the centroid $c_u$ is defined by using a spatiotemporal distance function std, which may be expressed as follows:

$$\text{std}(c_u, e_i) = sd(c_u, e_i) + k \times td(c_u, e_i), \quad (1)$$

where $sd(c_u, e_i)$ is a spatial component of the spatiotemporal distance function std, $td(c_u, e_i)$ is a time component of the spatiotemporal distance function std, and k is a parameter that may be set by the system administrator for adjusting the influence of the time component over the spatial component—e.g., if a statistical confidence associated with the probability function $p_d(t)$ is low. For example, probability functions $p_d(t)$ determined purely by means of a statistical analysis are deemed to have a low confidence; instead, probability functions $p_d(t)$ determined by means of detailed turnout information provided by management of the relevant locations are deemed to have a high confidence. In one embodiment of the invention, a small value of k (for example in the order of few hundreds of meters, such as 500 m, or lower) may be used in order to attenuate the influence of the time component in case of low confidence associated with the probability function $p_d(t)$.

In one embodiment of the invention, the spatial component $sd(c_u, e_i)$ may be defined as:

$$sd(c_u, e_i) = \max[0, \text{geo}(c, e_i) - (\bar{r} + r_i)], \quad (2)$$

where geo($c_u$,$e_i$) is the distance between the centroid $c_u$ and the position (i.e., based on the position data comprised in the event record $er_i$) at which the event $e_i$ occurred. In its turn, the time component td($c_u$,$e_i$) may be defined as:

$$td(c_u, e_i) = \begin{cases} \bar{p} - p_d(t_i) & \text{if } \bar{p} \times p_d(t_i) \geq 0 \\ 1 & \text{if } \bar{p} \times p_d(t_i) < 0 \end{cases}. \quad (3)$$

The result of the spatiotemporal distance function std computed for the event $e_i$ is then compared with a spatiotemporal threshold distance, such as for example the parameter k introduced in equation (1). If such result is equal to, or lower than, the spatiotemporal threshold distance the corresponding event $e_i$ is considered sufficiently close (in space and time), or similar, to the centroid $c_u$, and the event $e_i$ is deemed to belong to the cluster $C_u$. In case the result of the spatiotemporal distance function std is greater than the spatiotemporal threshold distance, the corresponding event $e_i$ is considered not belonging to the cluster $C_u$ (and will be associated with a different cluster)

It should be noted that in the embodiment according to the present invention, in which it is implemented the Hartigan Leader algorithm, it is not defined any minimum or maximum number of allowable clusters Cu that may be generated by the processing performed by the computation engine 110. Nonetheless, in other embodiments of the present invention (not herein detailed) an algorithm different than Hartigan Leader algorithm may be implemented that defines a predetermined minimum and/or maximum number of allowable clusters Cu. For example, another algorithm that may be implemented is a so called "k-means" algorithm as described in MacQueen, J., "Some methods for classification and analysis of multivariate observations", 1967 Proc. Fifth Berkeley Sympos. Math. Statist. and Probability (Berkeley, Calif., 1965/66) Vol. I: Statistics, pp. 281-297 Univ. California Press, Berkeley, Calif.

Afterwards, the computation engine 110 proceeds with the computation of a (cluster) weight value $W_u$ for each cluster $C_u$ (step 242) determined at the previous step 239. Each weight value $W_u$ can be composed by a linear combination of a plurality of partial weight values, e.g. three partial weight values $w_1$, $w_2$ and $w_3$ in a preferred embodiment of the invention. Each partial weight value $w_1$, $w_2$ and $w_3$ is designed to take into account statistical aspects that affect the identification and the location of the selected relevant location.

In a preferred embodiment of the invention, the weight value $W_u$ is computed as:

$$W_u = w_1 + \alpha w_2 + \beta w_3, \quad (4)$$

where $\alpha$ and $\beta$ are adjustment coefficients defined by the system administrator, through the administrator interface 120. For example, the adjustment coefficients $\alpha$ and $\beta$ are determined in a preliminary test phase of the system 100 by operating the latter with event records provided from a group of test individuals during an adjustment phase performed before providing the system 100 to users. In such a case, the actual positions and movements during a test observation period of the test individuals are precisely known and may be compared with the results provided by the system 100 and the adjustment coefficients $\alpha$ and $\beta$ are determined in order to minimize any discrepancy between actual relevant position visited by the test individuals and the results provided by the system 100.

For example, the (first) partial weight value $w_1$ takes into account the probability that each event $e_l$ (l=1, . . . , L; 0<L≤M) of the cluster $C_u$ has occurred, and may be expressed as:

$$w_1 = \sum_{l=1}^{L} p_d(t_l), \quad (5)$$

where $t_l$ (indicated in the time data of the corresponding event record $er_l$) is the time instant at which the event $e_l$ occurs on the observation subinterval d (indicated in the time data as well).

The (second) partial weight value $w_2$ takes into account the number of days (i.e., observation subinterval d) in which there are occurrence of events $e_l$ of the cluster $C_u$, i.e. the partial weight value $w_2$ is the number of days in which events $e_l$ of the cluster $C_u$ occurred, therefore, assuming that the observation period T is expressed in days:

$$1 \leq w_2 \leq T, \quad (6)$$

where 1 means that the events $e_l$ occur only on a single day of the observation period T and so on up to T, which means on each day at least one event $e_l$ of the cluster $C_u$ occurs.

The (third) partial weight value $w_3$ takes into account a weekly distribution of the occurrence of the events $e_l$. The partial weight value $w_3$ may be expressed as:

$$w_3 = T \times H(X), \quad (7)$$

where H(X) is the Shannon entropy, as described for example in C. E. Shannon "A Mathematical Theory of communication", Bell System Technical Journal 27 (July/October 1948), of the cluster $C_u$ (i.e., the Shannon entropy of the cluster Cu is computed by taking into account all the events $e_l$ of the cluster Cu) in the observation subinterval d (i.e., days of a week in the considered example), X is the day in which a generic event $e_l$ of the cluster $C_u$ occurs and T is the observation period expressed in days, or:

$$w_3 = T \times H(X) = T * \left(-\sum_{d=1}^{7} p(d) \cdot \log_2(p(d))\right), \quad (8)$$

where p(d) is the probability density that X corresponds to a particular observation subinterval d, e.g. p(1) is the probability density that X corresponds to Mondays and so on up to p(7), which is the probability density X corresponds to Sundays in case that the observation period T comprises days corresponding to one or more weeks and the observation subintervals d correspond to respective days of such one or more weeks.

In parallel to steps 215-242, a threshold weight value $W_{th}$ is computed (step 245). For example, the threshold weight value $W_{th}$ is computed by assuming that a whole set of events $e_l$ corresponding to a same individual (an ideal individual) and for which holds $p_d(t_l) > 0$, are generated in a same relevant location, i.e. the relevant location that is to be identified. Therefore, all the ideal events $e_l$ belong to a same (ideal) cluster $Cu_I$ and the threshold weight value $W_{th}$ may be computed through equation (4).

Preferably, the threshold weight value $W_{th}$ is used to provide an adjusted threshold value $W'_{th}$ (step 248):

$$W'_{th} = f \times W_{th}, \quad (9)$$

where f is an adjustment parameter that can be set by the system administrator in order to attenuate ($0 < f \leq 1$) the threshold weight value $W_{th}$.

The adjustment parameter f may be determined through the use of the information regarding the group of test individuals and during the same adjustment phase described above for determining the adjustment coefficients α and β.

In another embodiment according to the present invention, an alternative (adjusted) threshold weight value $W''_{th}$ is computed as:

$$W'_{th} = \mu + f \times \sigma, \quad (10)$$

where μ is the mean value of the weight values $W_u$ of all clusters Cu identified and σ is the variance thereof.

In a different embodiment of the present invention, as (simplified) threshold weight value $W'''_{th}$ it is simply selected the weight value $W_u$ with the highest value max ($W_u$) among all the weight values $W_u$ computed. In this way, the threshold weight value $W'''_{th}$ is determined in a very simple way under a computational point of view, but its implementation in the method provide a lower accuracy in the results compared with the accuracy obtained by implementing the threshold weight values $W'_{th}$ and $W''_{th}$.

The weight value $W_u$ and the adjusted threshold value $W'_{th}$ are then used for determining if the corresponding cluster $C_u$ is referred to a relevant location of the type previously selected by the user (step 251). The events $e_l$ of the cluster $C_u$ are considered occurred in a relevant location of the type selected by the user if it is verified that the weight value $W_u$ is equal to, or greater than, the adjusted threshold value $W'_{th}$, or:

$$W_u \geq W'_{th}. \quad (11)$$

If the comparison at the step 251 has a negative outcome (i.e., $W_u < W'_{th}$), the events $e_l$ of the cluster $C_u$ are not considered to have occurred in a relevant location of the type selected by the user, thus the cluster $C_u$ is discarded and the operation proceeds to step 227 where it is checked whether the event records group erg was the last event records group to be considered, as previously discussed. It should be noted that the weight $W_u$ (and/or any other intermediate result) might be stored in the repository 115, in order to be available for further processing (e.g., for verifying if the discarded cluster $C_u$ corresponds to a relevant location of a different type without recalculating the weight $W_u$).

On the contrary, if it is verified that the weight value $W_u$ is equal to, or greater than, the adjusted threshold value $W'_{th}$ (i.e., $W_u \geq W'_{th}$), the events $e_l$ of the cluster $C_u$ are considered to have occurred in a relevant location of the type selected by the user of the system 100.

Therefore, an indication of a position of such relevant location is computed (step 254). Preferably, but not limitatively, the indication of the position of the location may be computed as a single geographical point, e.g. geographical coordinates of the centroid $c_u$ of the cluster $C_u$, and/or as a geographical area, e.g. geographical coordinates of vertexes of the cells 105b of the mobile telephony network 105 in which the events $e_l$ of the cluster $C_u$ occurred.

Afterwards, the operation proceeds to the step 227, where it is checked whether the event records group erg was the last event records group to be considered as previously discussed. In the negative case, as previously discussed, operation proceeds to step 233 where the UE variable j is incremented by one (j=j+1) and the operation returns to the step 218 in which the (next) j+1-th event records group $erg_{j+1}$ stored in the repository 115 is retrieved.

In the affirmative case, i.e. each event records group erg in the repository has been analyzed, the operation provides the computation results at step 230 to the user through the user interface 125. For example, the user interface may provide to the user a map of the surveyed area 107 with marks or highlighted borders denoting the selected relevant location(s) identified. As an alternative or as an addition to the user data indicating the number of events $e_l$ occurred during the observation period, the number of the UE detected in the selected relevant location and similar data may be provided (preferably, deprived of sensitive data regarding the individuals for safeguarding privacy of the individuals). Obviously, the mentioned maps and data may be stored in the repository as well, e.g. to be used by the system administrator for refining the sets of probability functions $p_d(t)$.

After such provision of the computation results the operation of the system 100 is concluded.

Afterwards, the user may use the computation results provided by the system 100 for his/her purposes. Advantageously, the user is provided with a set of computation results each of which referred to a single individual (i.e., UE) associated with the analyzed respective event records group $erg_j$. This allows the user, according to his/her needs, to freely combine, compare, subdivide by portions of the geographical area such results in order to obtain desired information about relevant locations, habits of the individuals, movement of individuals between locations and other similar information.

The system 100 is thus able to automatically identify and locate relevant locations selected by a system user substantially regardless from how often an individual visits them. Particularly, the system 100 is adapted to retrieve large amount of information regarding UE activity over the surveyed area 107, analyze such information and convert them in useful information regarding individual habits requiring a very limited intervention from the user (or from the system administrator during its operation) and in a fast and reliable way.

It should be noted that the system 100 might be adapted to retrieve (or receive) data about individuals not exclusively from a mobile telephony network 105. Alternatively or in addition, the system may be configured to retrieve (or receive) data about individuals from one or more wireless computer networks, such as WLANs, operating in the surveyed area 107, provided that the UE of the individuals are capable to connect to such wireless computer networks.

The invention claimed is:

1. A method for identifying and locating at least one relevant location visited by at least one individual within a geographical area served by a wireless telecommunication network, the method comprising:

selecting a predetermined time period over which the identifying and locating of the at least one relevant location have to be performed;

selecting a typology of relevant location to be identified and located;

retrieving recorded time and position data recorded by the telecommunication network and regarding events in which a user equipment carried by the at least one individual interacted with the telecommunication network;

computing a probability that each event for which recorded time and position data have been retrieved occurred in the relevant location of the selected type based on the recorded time data;

identifying and clustering events that occurred within a predefined distance from each other and having a similar probability;

computing a weight value for each identified cluster of events;

comparing the weight value with a threshold weight value, if the weight value is equal to, or greater than, the threshold weight value, identifying the relevant location as belonging to the selected typology of relevant location, and providing an indication of the position of the at least one relevant location based on the recorded position data of the events of the cluster, or if the weight value is lower than the threshold weight value, identifying the relevant location as not belonging to the selected typology of relevant location.

2. The method according to claim 1, wherein the retrieving recorded time and position data comprises verifying minimum requirements for the time and position data for ensuring reliability and accuracy of the relevant location identification, wherein the verifying minimum requirements comprises one or more of the following:

verifying if a total number of events within the predetermined time period, associated with the at least one individual is equal to, or greater than, a total events threshold;

verifying if an average number of daily events, within the predetermined time period, associated with the at least one individual is equal to, or greater than, a predetermined average events threshold, and verifying if a number of events within a predetermined subinterval of the predetermined time period associated with the at least one individual is equal to, or greater than, a subinterval events threshold.

3. The method according to claim 1, wherein the computing a probability comprises exploiting a set of probability functions each of which describes a probability that the at least one individual is at the corresponding relevant location at a time instant defined in the time data during a predetermined subinterval of the predetermined time period.

4. The method according to claim 3, wherein the probability functions are based on statistical analysis data regarding an attendance rate of the selected typology of relevant location.

5. The method according to claim 1, wherein the identifying and clustering further comprises clustering events associated with the at least one individual in a same cluster only if they are sufficiently close in space and time to a centroid of the cluster.

6. The method according to claim 5, wherein the identifying and clustering further comprises exploiting the Hartigan Leader algorithm.

7. The method according to claim 5, wherein the identifying and clustering further comprises, for each event associated with the at least one individual, computing a spatiotemporal distance ($std(c_u,e_i)$) function expressed as:

$$std(c_u,e_i)=sd(c_u,e_i)+k \times td(c_u,e_i),$$

wherein $sd(c_u,e_i)$ is a spatial component of the spatiotemporal distance function, $td(c_u,e_i)$ is a time component of the spatiotemporal distance function, and k is an adjusting parameter for taking into account influence of the time component over the spatial component.

8. The method according to claim 7, wherein the identifying and clustering further comprises computing the spatial component ($sd(c_u,e_i)$) of the spatiotemporal function as:

$$sd(c_u,e_i)=\max[0, geo(c_u,e_i)-(\bar{r}+r_i)],$$

where $geo(c_u,e_i)$ is the distance between the centroid of the Cluster and the position indicated in the position data regarding the corresponding event, $\bar{r}$ is an average cluster radius and $r_i$ is a radius comprised in the position data regarding the event.

9. The method according to claim 7, wherein the identifying and clustering further comprises computing the time component ($td(c_u,e_i)$) of the spatiotemporal function as:

$$td(c_u, e_i) = \begin{cases} \bar{p} - p_d(t_i) & \text{if } \bar{p} \times p_d(t_i) \geq 0 \\ 1 & \text{if } \bar{p} \times p_d(t_i) < 0 \end{cases},$$

wherein $\bar{p}$ is the mean value of the probabilities computed for the events comprised in the cluster $C_u$, and $t_i$ is the time instant defined in the time data of the event for which the time component is computed.

10. The method according to claim 9, wherein the identifying and clustering further comprises comparing a result of the spatiotemporal distance function for the event with a spatiotemporal threshold distance and:

if such result is equal to, or lower than, the spatiotemporal threshold distance, considering the event as belonging to the cluster, whereas if such result is greater than the spatiotemporal threshold distance, considering the event as not belonging to the cluster.

11. The method according to claim 1, wherein the computing a weight value comprises composing the weight value as a linear combination of a plurality of partial weight values, each partial weight value being designed to take into account statistical aspects that affect the identification and the positioning of the selected relevant location.

12. The method according to claim 11, wherein the partial weight values comprise a first partial weight value ($w_1$) which takes into account the probability that each event of the cluster has occurred, and is expressed as:

$$w_1 = \sum_{l=1}^{L} p_d(t_l),$$

where $t_l$ is the time instant indicated in the time data at which the event occurs on within the predetermined subinterval, and L is the number of events clustered in the same cluster.

13. The method according to claim 11, wherein the partial weight values comprise a second partial weight value which takes into account the number of predetermined subintervals of the predetermined time period in which events of the cluster occurs.

14. The method according to claim 11, wherein the partial weight values comprise a third partial weight value ($w_3$) which takes into account a distribution of the occurrence of the events in a portion of the predetermined time period comprising a plurality of predetermined subinterval, and is expressed as:

$$w_3 = T \times H(X),$$

where $H(X)$ is the Shannon entropy of the cluster in a predetermined subinterval of the predetermined time period, and T is the predetermined time period expressed as a number of predetermined subintervals.

15. The method according to claim 11, further comprising computing a threshold weight value computed as per the weight value but based on an ideal cluster of ideal events associated with an ideal individual which are all generated in the selected relevant location and have a probability greater than zero.

16. The method according to claim 11, further comprising computing a threshold weight value computed as a linear combination of a mean value of the weight values of all clusters identified and a variance thereof.

17. The method according to claim 11, wherein the computing a threshold weight value comprises selecting as a threshold weight value the weight value with the highest value among all the weight values computed.

18. A system coupled to a wireless telecommunication network adapted to implement the method of claim 1, the system comprising:
   a computation engine configured to process data retrieved from a mobile telephony network;
   a repository configured to store at least one of:
      data regarding interactions between the user equipment and the mobile telephony network, computation results generated by the computation engine;
      any processing data generated by and/or provided to the system;
   an administrator interface configured to modify parameters and/or algorithms used by the computation engine and/or accessing data stored in the repository.

19. The system according to claim 18, further comprising at least one user interface configured to receive inputs from, and to provide output to a user of the system, the user comprising one or more human beings and/or one or more external computing systems subscriber of the services provided by the system.

* * * * *